United States Patent
Rosenbaum et al.

(10) Patent No.: US 6,917,009 B2
(45) Date of Patent: Jul. 12, 2005

(54) METHOD AND APPARATUS FOR PROCESSING MAIL PIECES

(75) Inventors: Walter Rosenbaum, Paris (FR); Hans-Jörg Grundmann, Stockach (DE)

(73) Assignee: Siemens Aktiengesellschaft, München (DE)

( * ) Notice: Subject to any disclaimer, the term of this patent is extended or adjusted under 35 U.S.C. 154(b) by 207 days.

(21) Appl. No.: 10/230,223

(22) Filed: Aug. 29, 2002

(65) Prior Publication Data

US 2003/0012407 A1 Jan. 16, 2003

Related U.S. Application Data

(63) Continuation of application No. PCT/DE01/00713, filed on Feb. 23, 2001.

(30) Foreign Application Priority Data

Mar. 2, 2000 (DE) .......................................... 100 10 241

(51) Int. Cl.$^7$ ................................................. G06K 9/00
(52) U.S. Cl. ....................... 209/584; 209/702; 209/900; 209/44.4
(58) Field of Search .................... 209/584, 3.3, 44.4, 209/702, 705, 900

(56) References Cited

U.S. PATENT DOCUMENTS

| | | | | |
|---|---|---|---|---|
| 4,632,252 A | * | 12/1986 | Haruki et al. | 209/546 |
| 4,641,753 A | * | 2/1987 | Tamada | 209/546 |
| 4,992,649 A | * | 2/1991 | Mampe et al. | 209/546 |
| 5,206,903 A | | 4/1993 | Kohler et al. | |
| 6,587,572 B1 | * | 7/2003 | Suchenwirth-Bauersachs et al. | 382/101 |
| 2002/0036160 A1 | * | 3/2002 | Reed | 209/546 |

FOREIGN PATENT DOCUMENTS

| | | |
|---|---|---|
| DE | 19531392 C1 | 1/1997 |
| EP | 0740450 A2 | 10/1996 |

OTHER PUBLICATIONS

Derwent Abstract for DE19531392.

* cited by examiner

Primary Examiner—Donald P. Walsh
Assistant Examiner—Kaitlin Joerger
(74) Attorney, Agent, or Firm—Siemens AG; Jacob Eisenberg

(57) ABSTRACT

A method and system for reading an address of a mail piece is set out wherein the address face of the mail piece is scanned and decoded to generate an electronically recognizable or readable destination address. If the destination address is not completely decoded, the image of the address face is temporarily stored in a grouping in a database. The grouping is then forwarded to an encoding clerk who has the highest priority and is available for the grouping. The priority of the deck is based on data such as the clerk's measured professional competence. Herein, factors include experience with a particular destination region, success rate, and the like.

26 Claims, 3 Drawing Sheets

METHOD AND APPARATUS FOR PROCESSING MAIL PIECES

CROSS REFERENCE TO RELATED APPLICATION

This application is a continuation of and claims priority to International Application No.: PCT/DE01/00713 which was filed Feb. 23, 2001 and designated the United States. This application also claims priority to German application 10010241.7 filed 2 Mar. 2000. Both of the aforementioned applications are incorporated herein by reference.

BACKGROUND OF THE INVENTION

The present invention relates to the field of mail processing and more particularly to a system and method for more efficient processing which takes advantage of the level of skill and experience of video coding clerks. The present invention is adaptable to function with existing mail processing techniques, making the invention extremely compatible with existing systems. As such, start up costs are reduced and applicability is enhanced. Additionally, the invention makes more efficient use of existing resources, thereby further reducing start up costs and lowering barriers to application.

Postal systems using automatic address reading via optical character recognition software (OCR) is known in the art as exemplified in German Patent DE 195 31 392 C1. Processing rates of 10 letters per second, 36,000 letters per hour, are no longer available with modern OCR letter sorting plants as current recognition reliability varies with font and overall paint quality of address information. Mail faces are automatically scanned and decoded to arrive at electronically recognizable characters indicative of at least the destination address. Mail pieces with recognized destination addressee are typically provided with a machine-readable bar code which facilitates additional mechanical processing into a desired sorting order and location. Bar code usage further enables mail piece sorting to the sorter level, wherein mail pieces are further sorted according to letter carrier delivery sequence. Because recognition rates of automatic reading systems vary, it has become necessary to support such systems with video encoding stations. Encoding stations are staffed by specialized clerks who manually decode images of mail pieces that were heretofore in the automatic process unrecognizable. The decoded image is then encoded so that the above bar code an be printed on the mail piece or other sub processing may occur. In essence, encoding stations manually perform what was not possible by machine. Addresses may also be converted into a sorting code via consultation of an index.

The video image of the mail piece address face is shown to the clerk via an online video coding systems (OVS) while the physical mail piece is kept in a delay loop. The mail piece is normally kept in motion for a select period of time sufficient for the clerk to perform his or her tasks. The average delay loop is 10 to 30 seconds long. The longer the delay loop, the higher the operating costs and overall processing plant size. A common problem with OVS is the limited time afforded the clerk by the average delay loop. Herein, sufficient time exists only for careful input of say the zip or postal rode. To address this problem, special coding technology has been developed to keep delay loops as short as possible. To increase coding productivity and/or enable indication by the clerk of more elements of the address, such as zip or postal code, street address, post office box, addressee, film, etc., the following methods are known in the art.

Preview Coding is a method which comprises simultaneous presentation of two mail item images, one above the other. The lower image is active, namely, its data is encoded. After apt training, it is possible for clerks to encode information of the lower and upper image. The upper image is consecutively active and processing is continuous. As such, it is possible to double the operator's productivity by a complete overlay of cognitive and motive functions during coding of sequential pictures.

Extraction Coding is a method which makes use of information encoded by clerks, such as the zip or postal codes. It has bean seen that only the zip or postal codes of the address elements can be reliably entered by a clerk during a typical online delay loop. Other information entered by clerks may include key elements of the address such as the street name. Normally, extraction coding is based on an especially developed set of rules, wherein a code of an exact length is used as an access key to an address register. For example, the ROYAL MAIL uses an extraction formula which is based on the first three and the last two letters of an address. From the address register, it is now possible to determine a match representing the destination address. However, with extraction coding, special rules have to be memorized by the clerks in order to avoid superfluous address information as well as to consider different characteristics such as direction (east, west) or categories (street, lane, road). Although certainly effective, extraction coding includes some disadvantages, including complex extraction rules often requiring consideration of details like street endings—elements which ore usually the most poorly written. Other disadvantages include, a high rate of undetermined extractions corresponding to more than one register listing, thereby making singular destination address determination not possible. In addition, productivity generally declines when clerks are required to make logical decisions in place of mutual repetitive keystrokes.

As the above coding techniques do not provide sufficient productivity with straight online coding, some coding systems have made use of offline coding, such as is described in U.S. Pat. No. 4,992,649. In offline coding, mail pieces with non-recognizable addresses are provided with additional information, such as a tracking identification (TID). The non-recognized mail pieces an stored outside of a delay loop, while images of the mail pieces are presented to clerks for encoding. As a result, the clerk is not under a running time limit. After decoding, the TID is associated with clerk inputted address information. Based upon the TID, common barcode sorting information can be applied to the mail piece. Now, the mail piece may reenter the mail stream and be subjected to normal sorting. Although the offline video coding process presents an effective alternative for encoding addresses, additional capacities and adequate logistics are required for the further processing with non-readable addresses.

A sorting system with several sorters is known from U.S. Pat. No. 4,672,252. Herein, the system comprises a sorting section, picture recording and OCR unit, and several coding stations. The rejected data from the OCR units are allocated to the video coding stations by a sorting unit. The video coding corrected data is then sent back to the originating sorters by the sorting unit. By including the frequency of the rejected data in each sorter as well as performance of the video coding stations, the selection of the video coding stations to process select mail pieces is made so as to maximise throughput and evenly distribute work among the coding stations. By this arrangement, where the individual sorters and the video coding stations are flexibly coupled, it is possible to associate select mail pieces with select sorters to achieve a balanced distribution.

BRIEF SUMMARY OF THE INVENTION

An advantage of the present invention is to provide a system and method for more effective mail handling and, in particular, to increase effectivity of video encoding in mail piece address reading systems. An additional advantage is the speeding up of rejected mail piece encoding so as to accommodate typical delay loops. An additional advantage it to increase the expertise and work satisfaction of coding clerks. These and other advantages are made available by the present invention which operates on the concept of using the individual knowledge and skill of a clerk to determine workload and priority thereof.

The present system comprises an OCR with feeding mechanism which runs mail pieces past the OCR. Successfully read mail pieces are imprinted with a bar code and sorted. Unsuccessful reads are temporarily stored and assigned to a clerk by an order sorting device. The region and clerk priority is based upon tracking data. The data is accumulated courtesy of clerk password and station and region performance.

The present invention includes a system for determining an address of a mail item comprising; a processor having means for receiving and updating priority rankings of encoding clerks, means for determining if said clerks are available to receive images to be encoded, means for grouping images based on select criteria; and an order sorting device for controlling said processor, distributing images to available clerks based on said priority of said clerks to encode said distributed images, and said order sorting device is electronically connected to said processor.

The present inventive method comprises the steps of sorting and grouping rejected mail pieces by region and conveying images of the grouped mail pieces to available clerks having the highest priority to process the images. In operation at an encoding station, clerks, before beginning work log in with their password. Henceforth, the system, and order sorting device in particular, is aware of the identity of the clerk, at which station the clerk sits, and the clerks priorities. As such, image processing orders can be automatically and electronically distributed to the appropriate clerk. An additional step includes the storage of images of unrecognizable mall pieces prior to their distribution to clerks. A further step includes reassigning partially read images back to their originating OCR units fox a second evaluation along with additional information from a clerk about the mail piece. Herein, the probability of a successful read substantially increases with use of the additional information. Should this second automatic reading process be again unsuccessful, the image with the partial results of the second automatic reading process can be resent to the clerk for further encoding. In another step, video encoding is first processed with extraction coding and a second video encoding (if necessary) is processed with an accompanying selection of possible results from the extraction coding.

The invention method includes a method for processing mail pieces, comprising the steps of determining a priority and availability of encoding station clerks; scanning an image of a mail piece; decoding said image to arrive at recognizable character of a destination address; determining if said decoding was effective; if said decoding was not effective, storing and adding said image to one of a grouping in a database; and forwarding said one of a grouping to an available clerk with the highest priority for said one of a grouping.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE INVENTION

Figure 1:
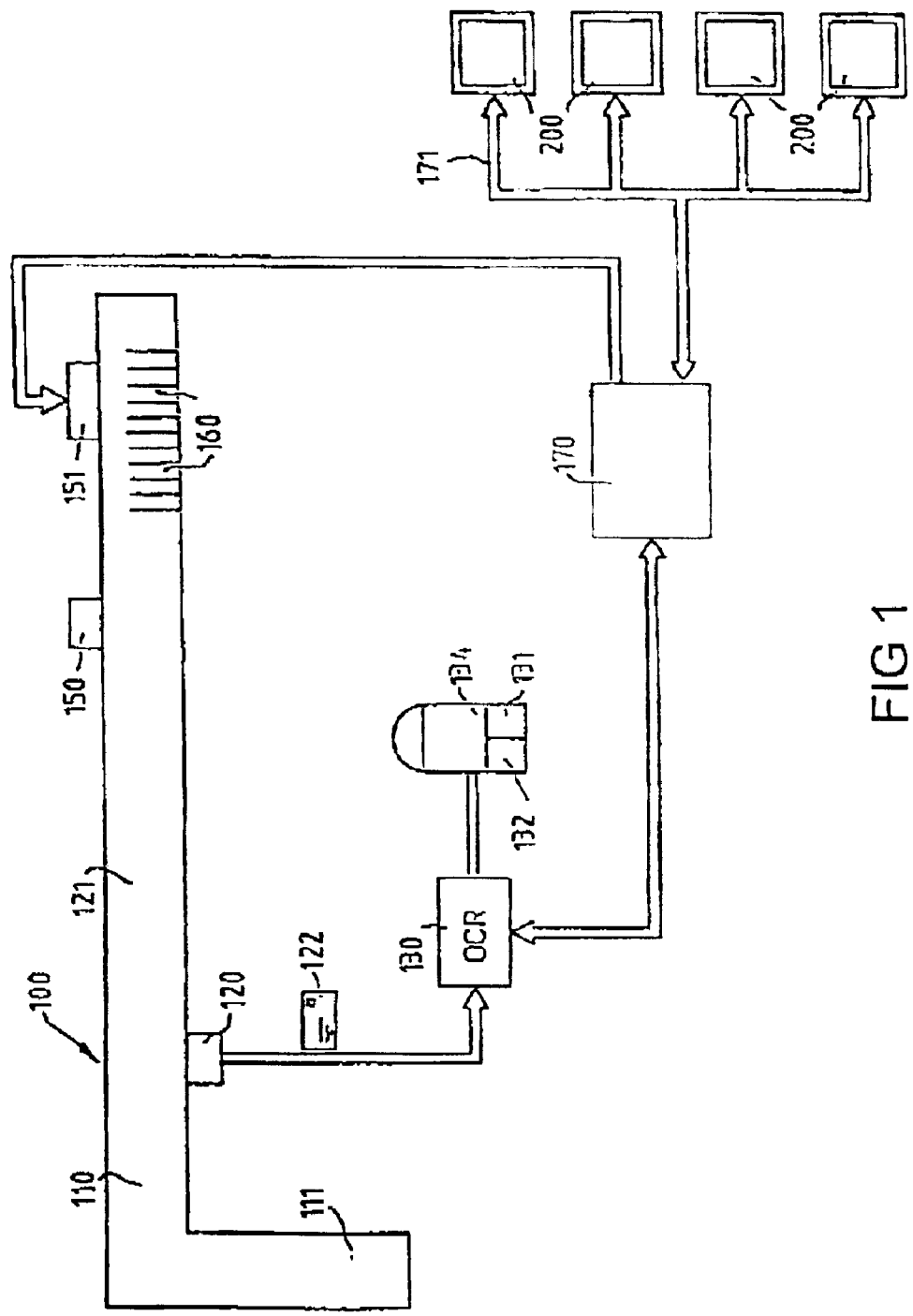
FIG. 1 depicts a schematic of a system for carrying out the present invention.

FIG. 1 depicts a schematic of a mail sorting system according to the present invention. An OCR mail sorter 100 is shown comprising a feeding mechanism 110 which pulls successive mail pieces from magazine 111 and transports the pieces to high-resolution video scanner 120 at a rate of approximately 10 mail pieces per second. The mail pieces normally depict address information on an address face or surface. An image 122 of the address face is made by scanner 120, which may comprise a high resolution video scanner or equivalents as known in the art. Image 122 is seat to OCR processor 130 wherein evaluation of address information is performed. In the mean time, the mail piece is held in a delay loop 121. Where the processing was successful, i.e. at least the destination address was recognizable and readable to the OCR, a bar code is made to be printed on the mail piece from bar code printer 150. The bar code corresponds to the destination address. The mail piece is then sorted into one of pockets 160 for subsequent sorting. An unsuccessful read occurs when the OCR does not recognize at least the destination address printed on the mail piece and appearing in image 122.

The OCR processor 130 comprises at least one microprocessor 131 having a memory 132 within which scanned images are temporarily stored. OCR processor 130 further comprises an address register 134 with zip codes, city names, street names and possibly other address related information therein. The information in the address register may be consulted during the image evaluation process so as to assist with evaluation of addresses and what not. Accordingly, it is not necessary to have a perfect read. Rather, by associating parts of the scanned address with stored addresses, an assumed destination address may be determined. The assumed destination address may be assigned a credibility rating to further assist with the overall evaluation process. The present system further includes an order sorting device 170. Device 170 sorts images to any number of video coding stations 200, of which four are depicted. Stations 200 may be connected via a local area network 171 to sorting device 170. In addition, sorting device 170 is connected to TID bar code printer 151. In the event of an unsuccessful read, the TID bar code printer 151 is instructed to print a TID on the mail piece. The mail piece is then either removed from processing and separately held or directed to a sufficient long delay loop which will allow for manual coding. As a result of the TID, the mail piece is able to rejoin the mail stream at a later time (after at least destination address determination) regardless of where the mail piece was held. Where the mail piece is on held in a delay loop or the like, evaluation of (tit mail piece is performed off line. Where the mail piece is held in a delay loop, evaluation is performed on-line. The evaluation is performed at one of video coding stations 200. As an alternative to the above described system, additional OCR mail sorters 100 and/or processors 130 may be incorporated herein.

Figure 2:
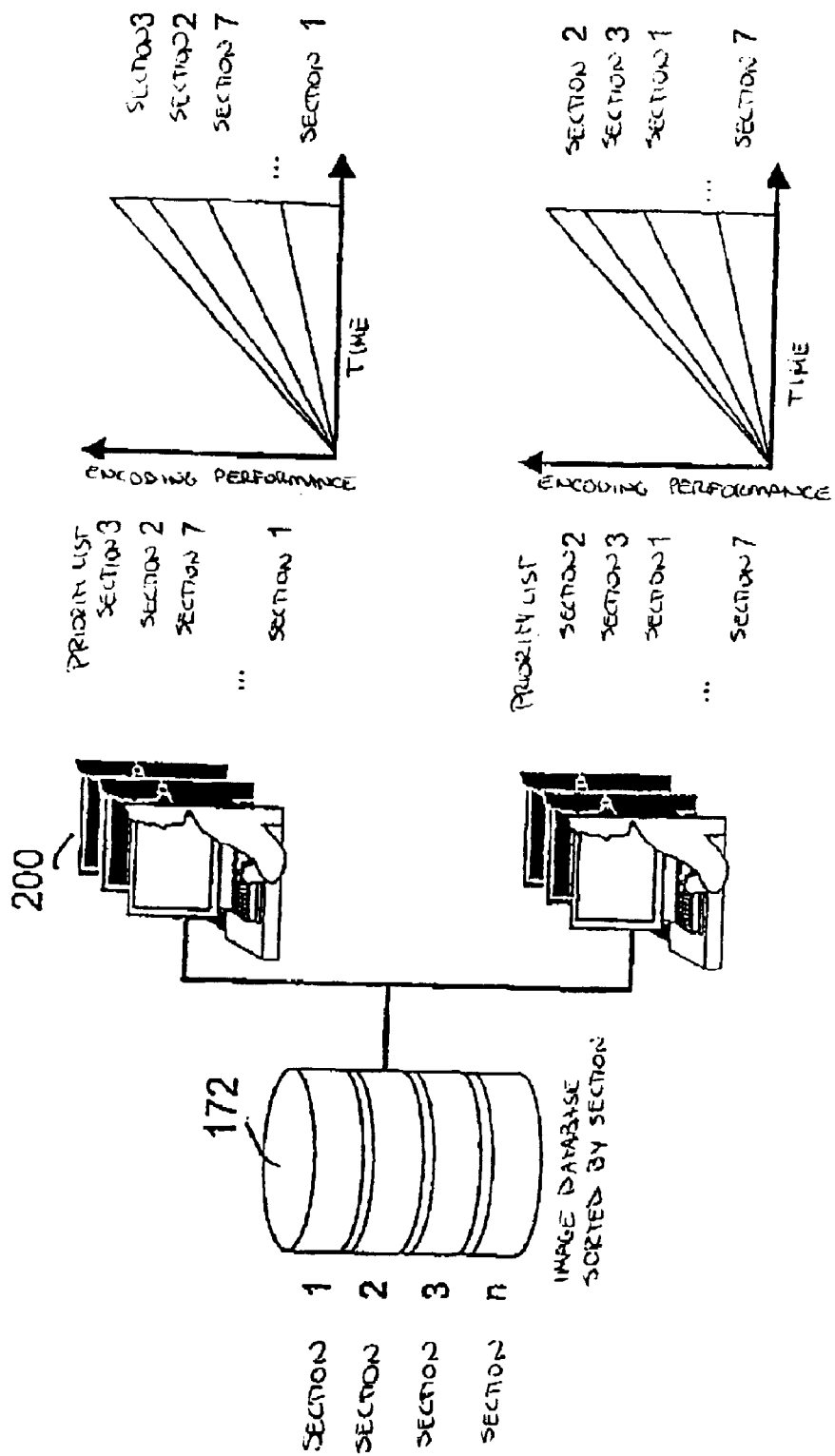
FIG. 2 depicts a procedural overview of the present invention.

As set out in FIG. 2, rejected mail piece images stored in database 172 are group in sections. Successfully read mail pieces are processed per the normal mail stream and their images are not stored in the database. The grouping of images into sections occurs at the order sorting device 170. This storage, or intermediate storage, of images is necessary because an adequate number of video coding stations and available clerks is not always a guarantee. The sections or groupings are assigned according to priority of the video coding stations as based on the current operating clerk. The sections or groupings are distributed on the basis of priority, with preference going to the highest priority and availability. The priority of the operating clerk is a product of statistically measuring certain criteria associated with effective clerking, including: overall experience, location experience, percentage of successful and unsuccessful encodings, position, background, education, and the like.

In the depicted example, the images are divided into n sections or groupings. As is further depicted, seven of the n sections or groupings are processed by two clerks. The clerk at the upper station checks in with the order sorting device 170, using her personal password, and is thereafter identified as being at that station. In addition, the priority associated with the clerk, is also assigned to that station. This facilitates the forwarding of select sections or groupings, an example of which is set out in the following table:

TABLE 1

| Priority | Section No. |
|---|---|
| 1 | 3 |
| 2 | 2 |
| 3 | 7 |
| . | . |
| . | . |
| . | . |
| 7 | 1 |

The clerk working at the lower coding station, following the above procedure would receive the following example workload:

TABLE 2

| Priority | Section No. |
|---|---|
| 1 | 2 |
| 2 | 3 |
| 3 | 1 |
| . | . |
| . | . |
| . | . |
| 7 | 7 |

The above two tables will now be used to demonstrate an example work flow. Assuming both stations are available to receive more images to be encoded, and images from section 3 require processing, the images for section 3 would be sent to the upper station. This is so because the upper station has the highest priority for images originating from section 3. If images from section 2 require processing, such images would be sent to the lower station for the same reason—priority. If the lower station was unavailable to receive section 2 images, these images would then go to the station with the neat highest priority. Accordingly, as the upper station has second priority for images from section 2, these images would then go to the upper station. Likewise, if the contrary is true and there is insufficient work to fill the highest priority of a station, that station would receive images from its next highest priority. Accordingly, the use of the skill level of the clerks, now prioritized, can be maximized thereby resulting in efficient use of manpower and resources.

The present method also integrates known coding methods into the above. One such coding method, extraction coding maybe incorporated herein. For example, prior to the sorting device forwarding images to clerks, such images may be applied to address register 134 and at least partial matching of information performed. Such partial matching is then sent along with the image to the clerk for coding. In addition, depending on the degree of matching, the clerk may also be provided with a list of possible matches to select from, thereby decreasing the amount of work on the clerk. Preferably, application of extraction coding occurs offline so as to spare long delay loops and other resources. Lastly, of course, is the possibility that via address register 134, a statistically acceptable match is made thereby foregoing the need for manual coding.

Figure 3:
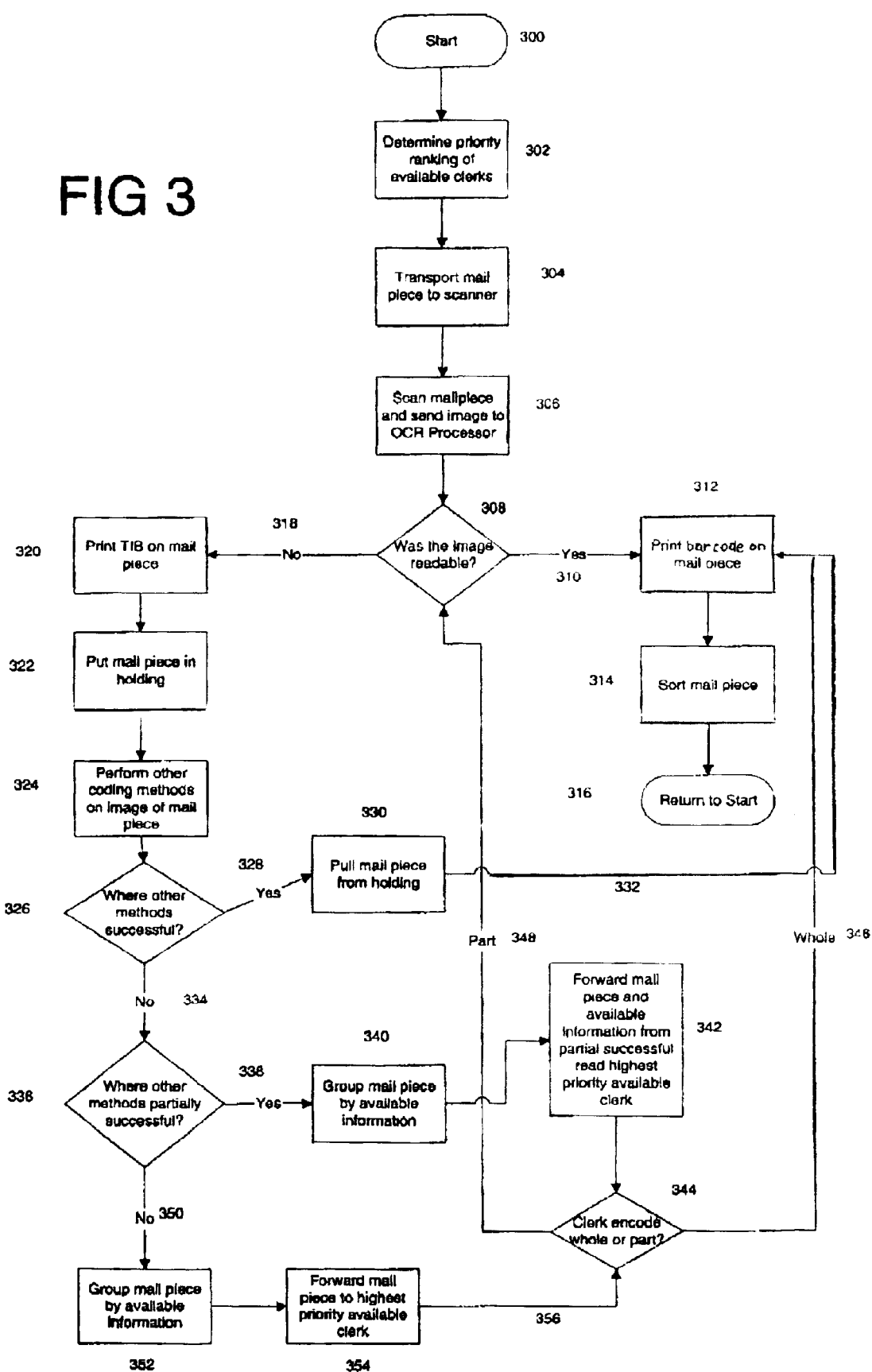
FIG. 3 depicts a method performed by a system of the present invention.

FIG. 3 sets out a flowchart of a method according to the present invention. The basis for the method is discussed above in detail. Referring to FIG. 3, the method starts (300) and proceeds to determining a priority ranking of available clerks (302). This is an on-going step that is subject to update whenever a clerk goes off tine. A clerk goes off line when going on break, home or the like. A mail piece is transported to a scanner (304), scanned and sent to an OCR processor (306). A determination is made whether the OCR processor successfully read at least the destination address of the scanned mail piece (308). If there was a successful reading (310), a bar code is printed on the mail piece (312) and the mail is sorted for delivery within the normal postal stream (314). The method then returns to start (316). If there was an unsuccessful reading (318), a TIB is printed on the mail piece (320) and the piece is put into holding (322), which as discussed above may be a delay loop, off line storage, and the like. Other coding procedures, aside from OCR, is performed on the unsuccessfully read image (324). The other coding methods are also discussed above. A determination is made whether the other coding methods were successful (326). If the other methods were successful (328), the mail piece is pulled from holding (320), imprinted with a bar code (312) and sorted (314). The method then returns to start (316). If the other coding methods ware unsuccessful (334), a determination is made whether the other coding methods were partially successful (336). If the other methods were partially successful (338) the mail piece image is grouped by available information (340). The image and gathered information thereover, along with other items in the group, are forwarded to the clerk with the highest priority for that group (342). A determination is then trade whether the dark encoded the whole destination address (or selected from a list of possible addresses) or gave feedback assistance to the (other) coding processes (part) (344). It the clerk encoded the whole address (346), a bar code is printed on the mail piece (312), the mail piece is sorted (314), and the process returns to (316). If feedback (part) was provided by the clerk (348), the image is subjected again to coding procedures (308) and the method runs its course. If other methods were not partially successful (350), the image is grouped by whatever information (if any) that is available (352) and forwarded to the clerk with the highest priority for such group (354, 356). Certainly a grouping may exist for images with no available information for which clerks may have high priority based on their expertise. The method then runs its course from decision step 344. At any time in the process a new mail piece may be introduced (304) while a former mail piece is being processed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for processing mail pieces, comprising the steps of:
   determining a priority and availability of encoding station clerks;
   scanning an image of a mail piece;
   decoding said image to arrive at recognizable characters of a destination address;
   determining if said decoding was effective;
   if said decoding was not effective, storing and adding said image to one of a grouping in a database;
   forwarding said one of a grouping to a clerk with the highest priority for said one of a grouping;
   if said clerk is unavailable, forwarding said one of a grouping to another clerk, said another clerk having a same or lower priority than said clerk; and
   wherein said priority is base on measured knowledge and skill of said clerk and said availability is based in password entry by said clerk.

2. The method according to claim 1, wherein said step of storing and adding is based on destination region of said mail piece.

3. The method according to claim 1, wherein said step of storing and adding is based on information obtained from said step of decoding.

4. The method according to claim 1, wherein said step of storing and adding further comprises the step of printing an identification bar code on said mail piece.

5. The method according to claim 4, wherein identification bar code is a tracking identification bar code.

6. The method according to claim 4, wherein said step of storing and grouping further comprises the step of sorting said mail piece to a temporary holding.

7. The method according to claim 6, wherein said temporary holding comprises a delay loop.

8. The method according to claim 1, further comprising the step of printing a destination bar code on said mail piece if said decoding was effective.

9. The method according to claim 1, wherein said step of decoding further comprises using optical character recognition means for performing said decoding.

10. The method according to claim 9, wherein said step of decoding further comprises the steps of determining if said destination address was recognized and if not further applying preview coding to said image.

11. The method according to claim 9, wherein said step of decoding further comprises the steps of determining if said destination address was recognized and if not further applying extraction coding to said image.

12. The method according to claim 10, wherein said preview coding is performed with assistance of mail piece identification information provided by said clerk.

13. The method according to claim 11, wherein said extraction coding is performed with assistance of mail piece identification information provided by said clerk.

14. The method according to claim 12, further comprising the step of determining if said destination address was recognized with said preview coding, and if not, sending said image back to said clerk.

15. The method according to claim 13, further comprising the step of determining if said destination address was recognized with said extraction coding, and if not, sending said image back to said clerk.

16. The method according to claim 1, further comprising the steps of:
   determining if a portion of said characters is recognizable;
   if a portion of said characters is recognizable, searching a database for matches to said portion of said characters;
   forwarding to said clerk result from said step of searching.

17. The method according to claim 1, further comprising the step of repeating said step of forwarding for each of said grouping.

18. A system for determining an address of a mail item comprising:
   a processor having means for receiving and updating priority rankings of encoding clerks, means for determining if said clerks are available to receive images to be encoded, means for grouping images based on select criteria;
   and order sorting device for controlling said processor and distributing images to available clerks based upon said priority of said clerks to encode said distributed images, and said order sorting device is electronically connected to said processor and comprises means for distributing images to a clerk having a highest priority and if the clerk is unavailable means for distributing images to another clerk, said another clerk having a same or lower priority than said clerk; and
   wherein said priority is based on measured knowledge and skill of said clerk and said availability is based on password entry by said clerk.

19. The system according to claim 18, further comprising:
   a scanner for scanning and making an image of an address face of said mail pieces, said scanner electronically connected to said processor,
   decoding means included with said processor, said decoding means for decoding said image and generating an electronically recognizable destination address,
   holding means associated with said feeding mechanism for accommodating said mail pieces while said decoding means is in operation,
   at least one bar code printer for printing a barcode on said mail pieces,
   feeding mechanism for drawing mail pieces from a magazine and routing said mail pieces past said scanner, holding means, and at least one bar code printer, and
   a plurality of encoding stations for accommodating said clerks, said encoding stations electronically connected to said order sorting device.

20. The system according to claim 19, wherein said encoding stations are networked to said order sorting device.

21. The system according to claim 19, wherein said holding means comprises a delay loop.

22. The system according to claim 19, wherein said at least one bar code printer comprises two bar code printers, a first printer for printing a destination code bar code identifying said destination address and a second printer for printing an identification bar code identifying said mail piece while said piece is in said holding means.

23. The system according to claim 19, wherein said processor means further comprises:

a memory for storing said images, a microprocessor for effecting said means for receiving and updating, means for determining, means for grouping, and said storing, and an address register comprising destination address information for matching with queries of at least a portion of said decoded destination address.

24. The method according to claim 1, wherein said priority comprises at least one of encoder experience, encoder location experience, encoder percentage of successful and unsuccessful encodings, encoder position, encoder background, and encoder education.

25. The system according to claim 18, wherein said priority comprises at least one of encoder experience, encoder location experience, encoder percentage of successful and unsuccessful encoding, encoder position, encoder background, and encoder education.

26. The system according to claim 18, further comprising means for conveying said password to said sorting deice and said sorting device further comprises means for receiving and evaluating said password.

* * * * *